March 24, 1925.
A. K. RARIG
1,530,515
FEEDER VALVE FOR VACUUM SEALING MACHINES, ETC
Filed April 19, 1924    8 Sheets-Sheet 1
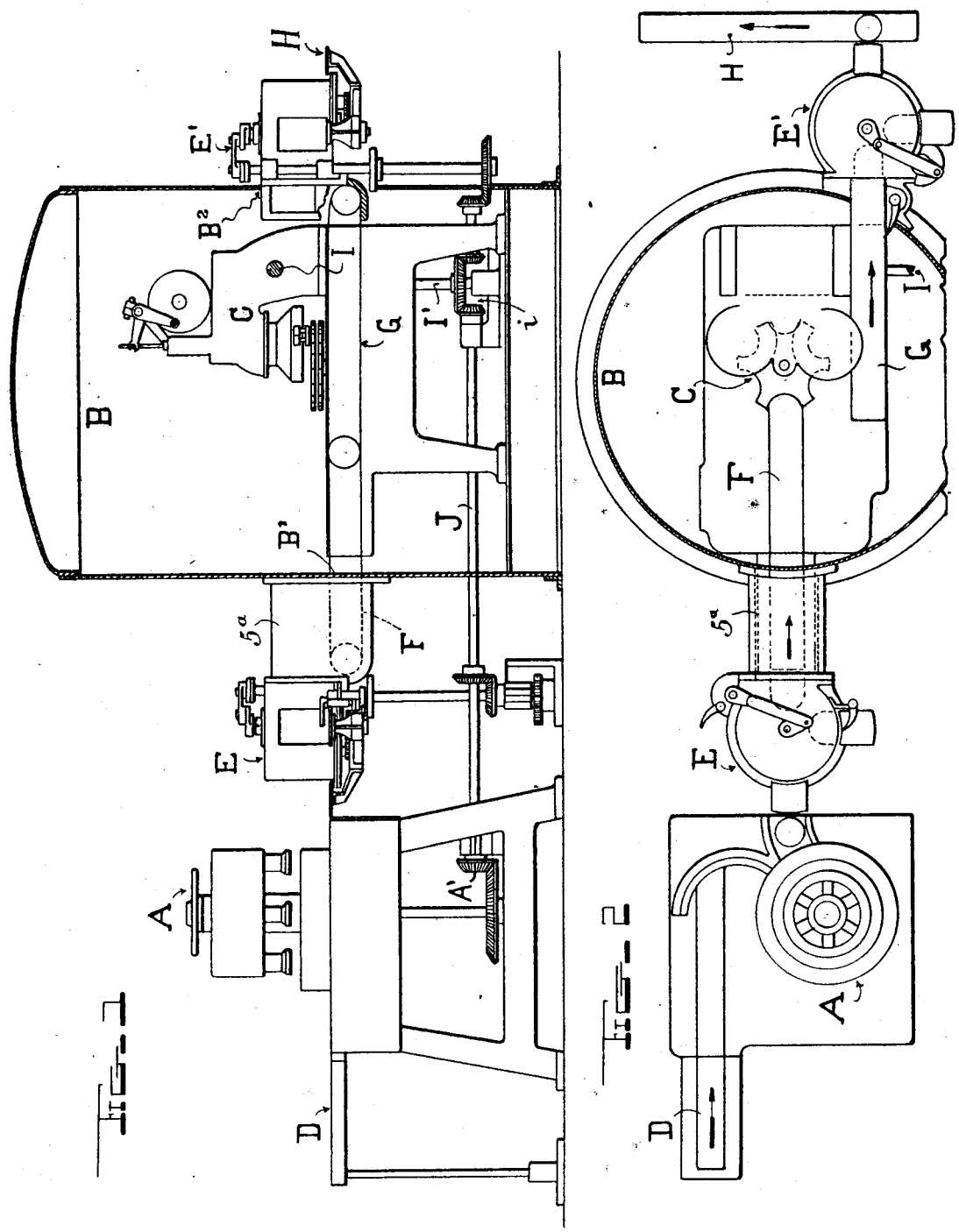
INVENTOR.
Alexander K. Rarig
BY
ATTORNEY

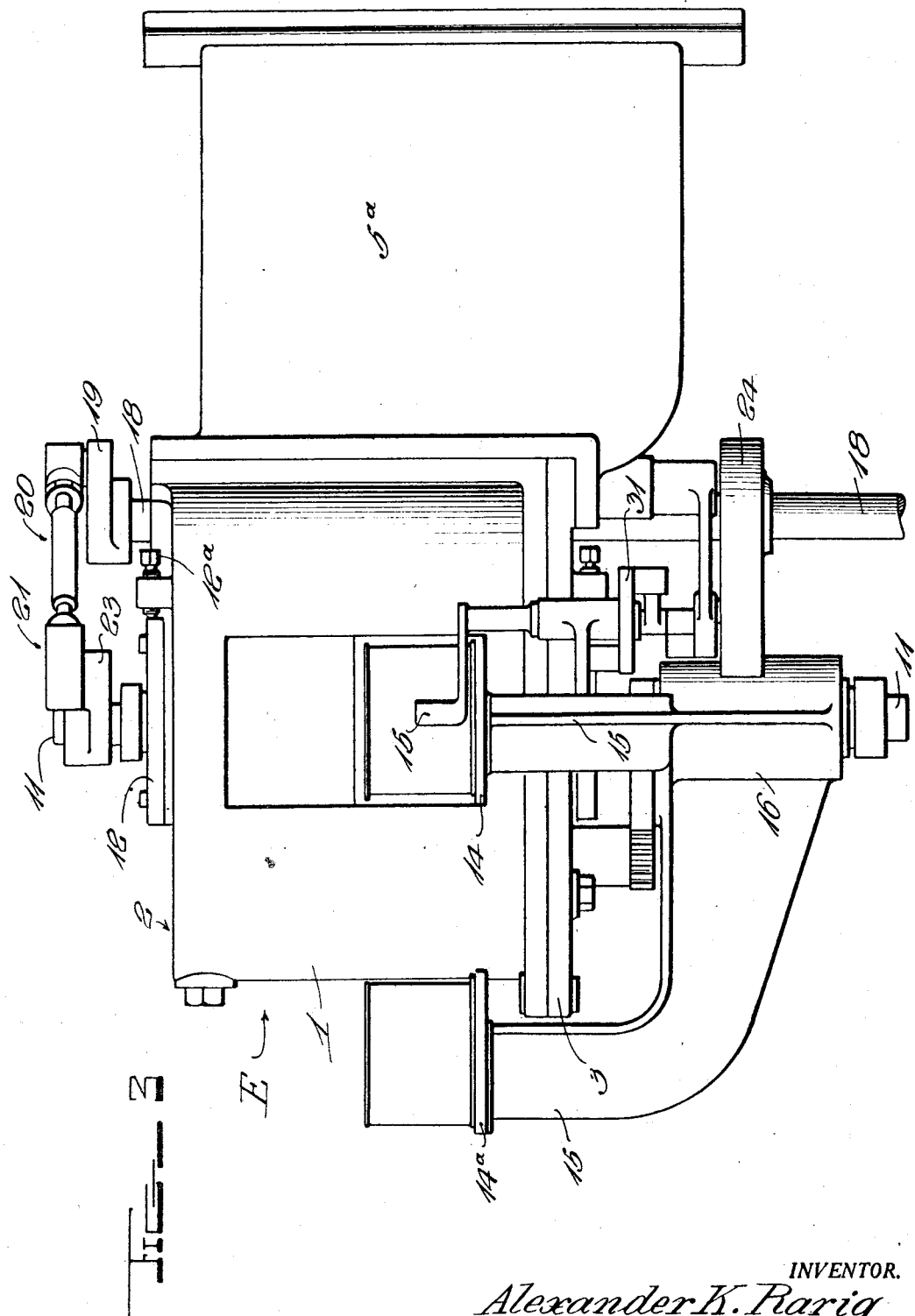

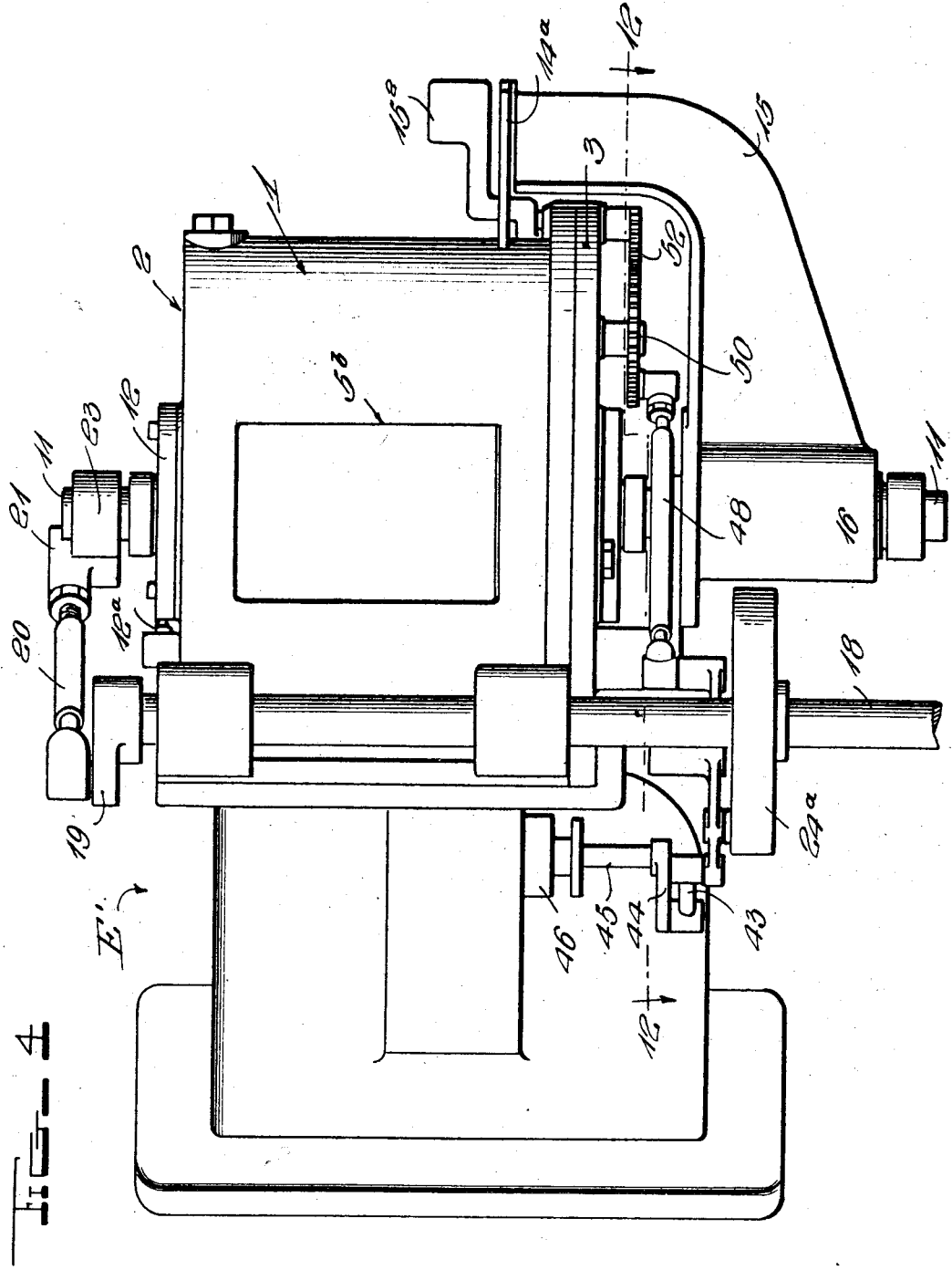

March 24, 1925.

A. K. RARIG 1,530,515

FEEDER VALVE FOR VACUUM SEALING MACHINES, ETC

Filed April 19, 1924    8 Sheets-Sheet 4

INVENTOR.
Alexander K. Rarig
BY
ATTORNEY

March 24, 1925.
A. K. RARIG
1,530,515
FEEDER VALVE FOR VACUUM SEALING MACHINES, ETC
Filed April 19, 1924    8 Sheets-Sheet 5
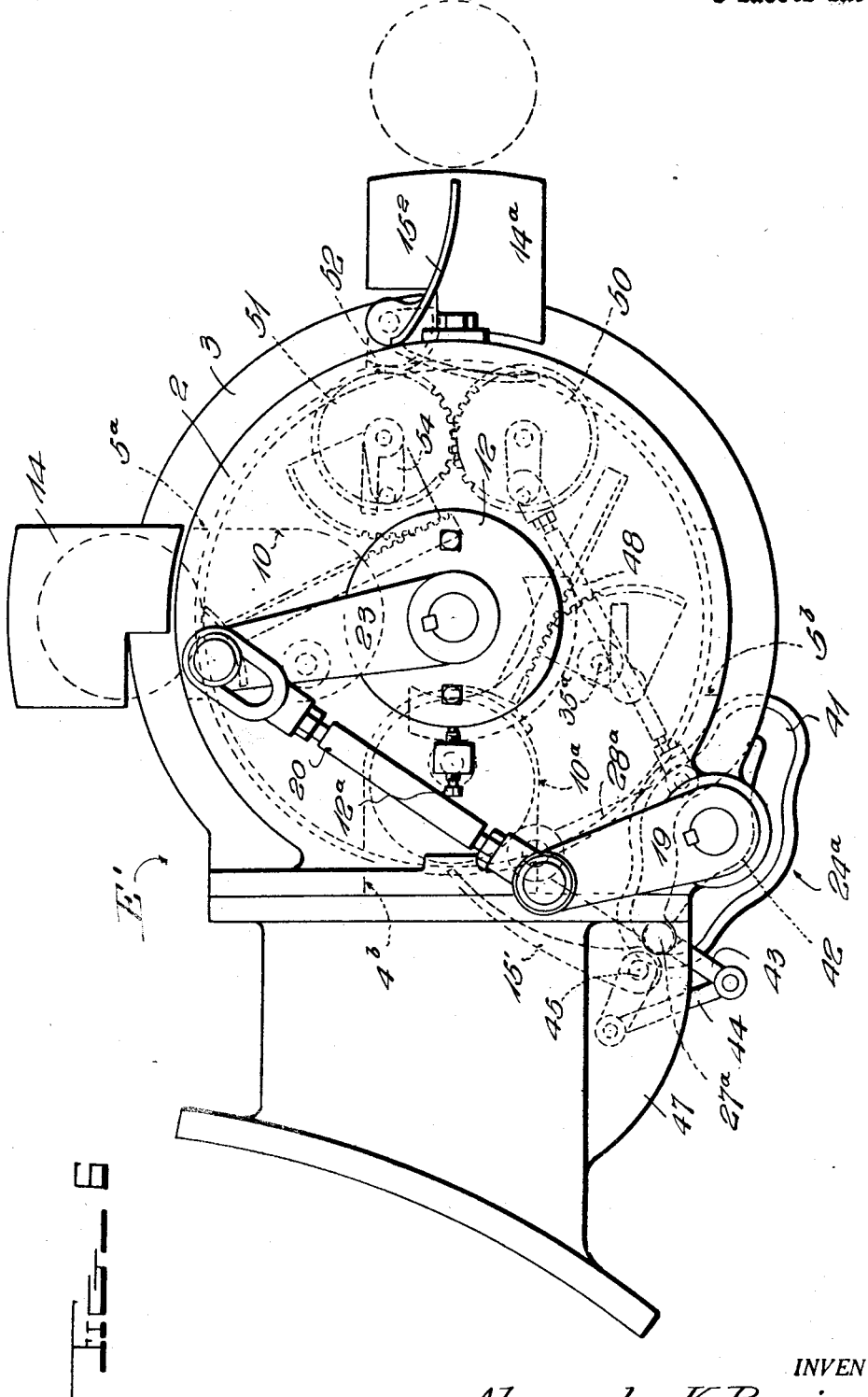
INVENTOR.
Alexander K. Rarig
BY
ATTORNEY

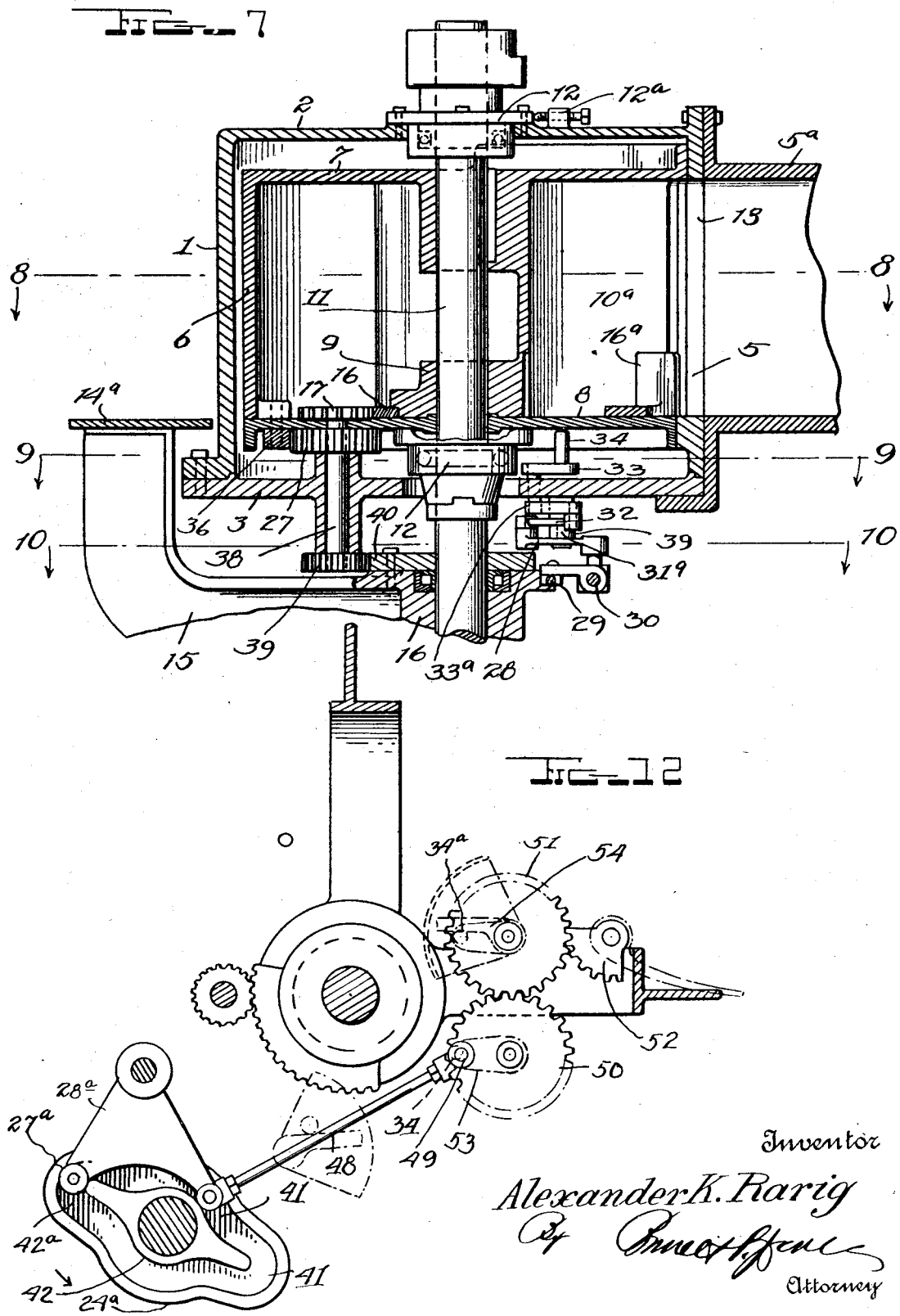

March 24, 1925.
A. K. RARIG
1,530,515
FEEDER VALVE FOR VACUUM SEALING MACHINES, ETC
Filed April 19, 1924   8 Sheets-Sheet 7
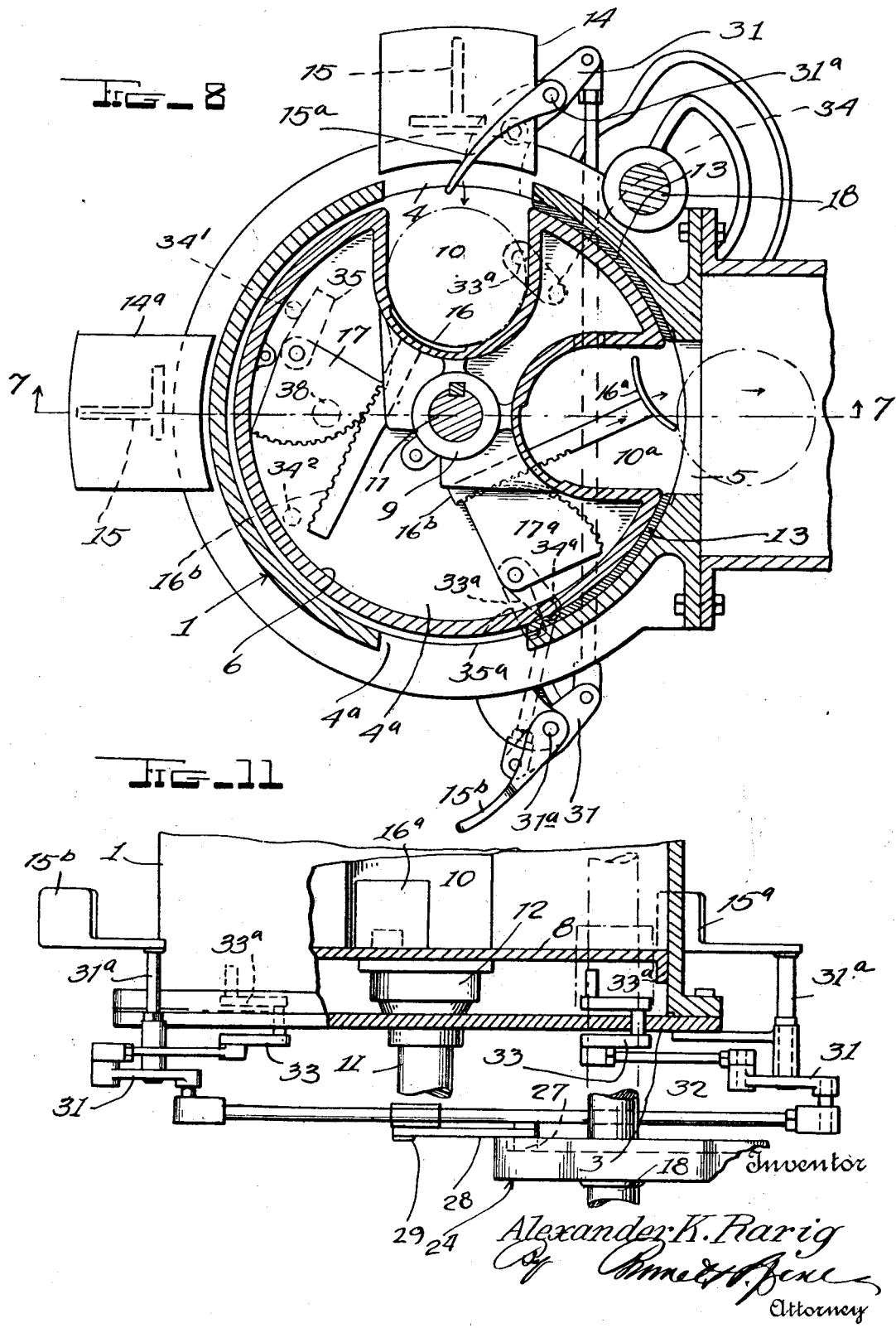

March 24, 1925.  1,530,515
A. K. RARIG
FEEDER VALVE FOR VACUUM SEALING MACHINES, ETC
Filed April 19, 1924  8 Sheets-Sheet 8
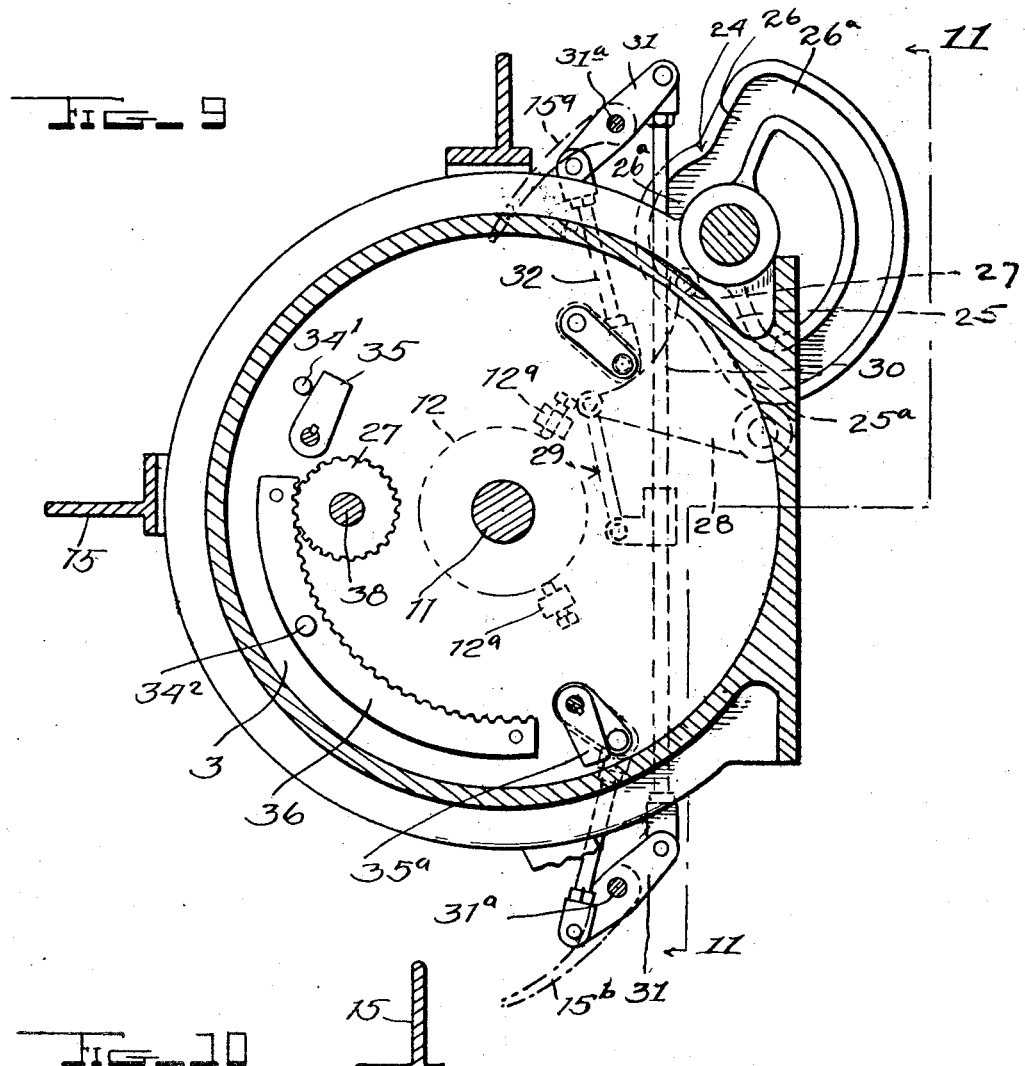
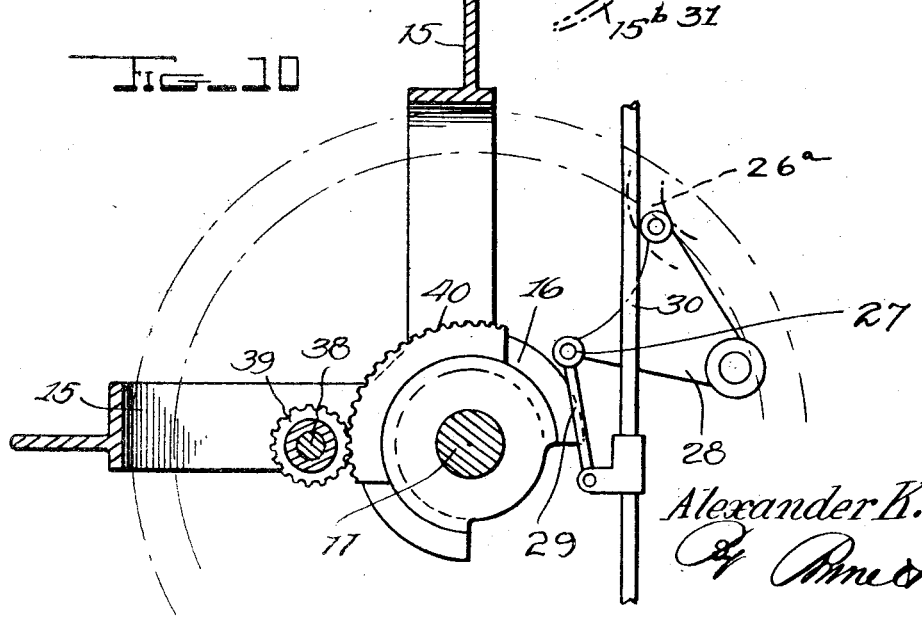
Inventor
Alexander K. Rarig
Attorney Patented Mar. 24, 1925.

1,530,515

UNITED STATES PATENT OFFICE.

ALEXANDER K. RARIG, OF SAN FRANCISCO, CALIFORNIA.

FEEDER VALVE FOR VACUUM-SEALING MACHINES, ETC.

Application filed April 19, 1924. Serial No. 707,757.

*To all whom it may concern:*

Be it known that I, ALEXANDER K. RARIG, a citizen of the United States, residing at San Francisco, in the county of San Francisco and State of California, have invented new and useful Improvements in Feeder Valves for Vacuum-Sealing Machines, Etc., of which the following is a specification.

This invention relates to improvements in feeder valves for vacuum sealing machines designed for the purpose of packaging coffee, milk, foodstuffs and other substances in vacuum. More particularly the invention relates to improvements in sealing machines of that type in which the containers, to which the lids are first loosely applied, as by a clinching machine, are conveyed to a vacuum chamber wherein the air is exhausted from the containers and the lids then tightly applied by the action of a seaming machine, such as of the double-seamer type, so as to hermetically seal the containers for contents-preserving purposes, at the conclusion of which operation the vacuumized and sealed containers are discharged from the vacuum-chamber. In all such machines special means of some suitable kind must be employed for feeding the containers into and discharging them from the vacuum-chamber, while at the same time sealing the container inlet and discharge openings of the vacuum-chamber so as to preserve a comparatively high degree of vacuum therein; and my invention is especially directed to the provision of novel and improved injector and ejector valves designed for these purposes.

One object of my invention is to provide injector and ejector valve devices which are simple of construction, reliable and efficient in operation, and adapted to rapidly feed the containers into the vacuum-chamber while sealing the vacuum-chamber securely against the loss of vacuum.

Another object of my invention is to provide oscillatory injector and ejector valve devices operating in conjunction with each other and with clinching and sealing machines in such manner as to secure accurately timed movements and a synchronous working action of all the parts.

Still another object of the invention is to provide oscillatory valve devices each of which will operate upon at least two containers at a time alternately for receiving and delivery actions, and in which readily adjustable means of efficient type are employed for taking up wear and maintaining an effective sealing connection between each valve and the vacuum-chamber.

A still further object of the invention is to provide an organized machine structure, including the injecting and ejecting valves, whereby the operations of loosely fitting the lids upon the containers after they have been filled, feeding the containers to the vacuumizing chamber, vacuumizing and hermetically sealing the containers, and discharging the sealed containers, may be smoothly and rapidly performed.

With these and other objects in view, the invention consists of the features of construction, combination and arrangement of parts, hereinafter fully described and claimed, reference being had to the accompanying drawings, in which:—

Figure 1 is a diagrammatic sectional side elevation of a vacuumizing machine embodying my invention.

Figure 2 is a similar top plan view of the same.

Figure 3 is a view in side elevation of the injector valve.

Figure 4 is a similar view of the ejector valve.

Figure 6 is a similar view of the ejector valve.

Figure 7 is a vertical longitudinal section of the injector valve, the plane of section taken, for example, on line 7—7 of Figure 8.

Figure 8 is a horizontal section on the line 8—8 of Figure 7.

Figure 9 is a horizontal section on the line 9—9 of Figure 7.

Figure 10 is a horizontal section on the line 10—10 of Figure 7.

Figure 11 is an enlarged irregular vertical section taken on the line 11—11 of Figure 9.

Figure 12 is a horizontal section similar to Figure 10 through a portion of the ejector valve and taken substantially on line 12—12 of Figure 4.

Figure 5:
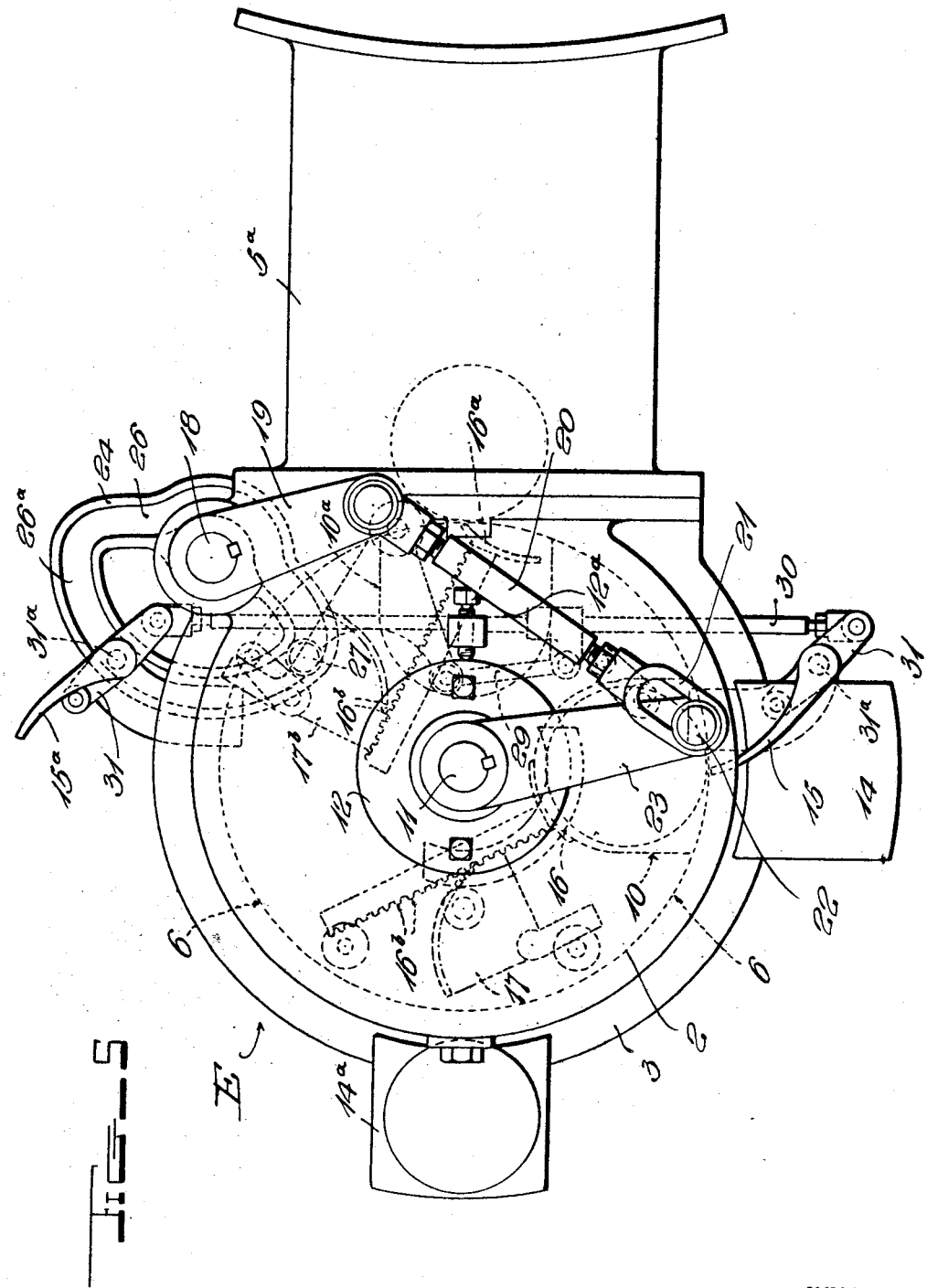
Figure 5 is a top plan view of the injector valve.

Referring now more particularly to the drawings, wherein in Figures 1 and 2, I have shown, with the exception of the container filling machine, the various units of a complete packing apparatus, A indicates in general the container lid-applying machine, B the vacuumizing chamber, having the container inlet B' and the container outlet B², C the container-seaming machine, conventionally illustrated as a double-seamer, arranged within the vacuumizing chamber, D the conveyor for transferring the containers from the filling machine to the lid-applying machine, E and E' my improved oscillatory injector and ejector valve devices, F the conveyor for transferring the containers from the injector valve device E to the turret of the seamer, G the conveyor for transferring the containers from the seamer to the ejector valve E', and H the final conveyor for receiving the sealed containers from the ejector valve E' and conducting them to any desired destination point. The units above described are arranged as usual in line-formation, and a shaft I is herein shown for the application of power for driving the seamer C from any suitable source. A shaft I', driven by the seamer-mechanism, is geared, as at $i$, to a horizontal shaft J, for transmitting driving power to the other working units of the apparatus, as hereinafter described. In practice, a vacuum pump is provided for creating and maintaining the desired degree of vacuum in the chamber B, illustration of which has been omitted as not essential to an understanding of my invention.

The injector and ejector valves E and E' are generally similar in construction, differing only in certain details hereinafter set forth, so that a description of the valve E will in general apply to both valves, similar reference characters being used to denote corresponding parts of both valve devices wherever such are employed. As shown, the valve E comprises a stationary circular casing 1 having an integral upper head 2 and a detachable lower head 3, the latter allowing assemblage and disassemblage of interior parts and being secured in position by any approved type of fastening means. The casing 1 is closed at its side facing the unit A, provided with diametrically disposed container receiving inlet openings 4—4ª in its sides at right angles to such closed side, and provided in its side, opposite said closed side and facing the vacuum-chamber B, with a container discharge outlet 5. In the present instance the outlet 5 is shown as connected with the inlet B' of the chamber B by a neck 5ª forming a container guide passage, which encloses also the receiving end of the conveyor F. Within the stationary casing 1 operates an oscillatory combined container-feed drum and valve 6 comprising a cylinder having an integral upper head 7 and a detachable lower head 8, the latter being secured in position by any desired and suitable type of fastening means. The drum is formed with a central hub 9 and a pair of can-receiving pockets 10—10ª, said pockets opening respectively through two sides of the drum at right angles to each other and being adapted for cooperation with the inlets 4—4ª and outlet 5 of the casing 1. The hub 9 is keyed to a shaft 11 extending vertically through the heads 2, 3, 7 and 8 and journaled in anti-friction bearings 12 fitted somewhat loosely in openings in the heads 2 and 3, set screws or similar adjusting devices 12ª being provided for adjusting the drum 6 and shaft as a unit in a direction toward and from the side of the casing 1 containing the discharge outlet 5. Set in that portion of the wall of the casing 1 between the outlet 5 and the respective inlets 4—4ª are removable wear-liners 13 of Babbitt-metal or other suitable relatively soft metal, said liners providing renewable valve-seat surfaces against which the surfaces of the drum 6 on opposite sides of the pockets 10—10ª bear in the movements of said pockets into and out of registry with the discharge outlet 5. By the suction pull on the discharge side of the drum, due to the presence of the vacuum in the chamber B, the outlet 5 is always securely sealed against the access of air therethrough to the vacuum chamber. Through adjustment of the screws 12ª the movement of the drum toward the wear-surfaces 13 under such suction pull may be regulated and controlled to a nicety, allowing an effective sealing action to be obtained, while preventing undue binding of the drum against the wear-surfaces.

Arranged for cooperation with the drum is a double outside conveyor comprising conveyor members 14—14ª. These consist of container supporting platform plates carried by arms 15 fixed to a hub 16 loosely mounted upon the shaft 11, said conveyor platforms being arranged at right angles to each other and relatively fixed for oscillatory motion in unison. The drum and outside conveyors oscillate simultaneously in reverse directions, each through an arc of 90°, the drum motion being such that the pocket 10 oscillates back and forth between the inlet 4 and outlet 5 and the pocket 10ª between the inlet 4ª and outlet 5, while the outside conveyor motion is such that the conveyor platform 14 oscillates back and forth between the discharge outlet of the lid-applying machine A and the valve inlet 4 while the conveyor platform 14ª oscillates back and forth between the outlet of the lid-applying machine A and the valve inlet 4ª. Figure 8 shows the aforesaid parts in one of their working positions, the pocket 10ª being represented in the discharge position facing the outlet 5 to which it has been moved from its former receiving position in registry with the inlet 4ª, the pocket 10 in its receiving position facing the inlet 4 and in readiness to be moved to the discharge position occupied by pocket 10ª, the conveyor 14ª in position to receive a container from the outlet of the lid-applying machine A, for subsequent transfer to the inlet 4ª, and the conveyor 14 in registry with the pocket 10 to which it has been moved from the position occupied by conveyor 14ª, to which position the conveyor 14 is turned on the next oscillation of the outside conveyor unit, preparatory to the transfer of another container from the outlet of the lid-applying machine A to the inlet 4. Disposed for coaction with the outside conveyors and inlets 4—4ª are oscillatory feed fingers 15—15ª, operative for transferring the containers from said outside conveyors into the drum pockets through said inlets, and disposed for cooperation with the pockets 10—10ª are sliding container ejectors 16—16ª carried by the drum 6 and each in the form of a pushbar having rack teeth 16ᵇ, the rack teeth of the respective push-bars being engageable by gear segments 17—17ª mounted within the drum chamber, said bars being movable through the walls of the pockets into and out of the enclosed chamber of the drum. The ejectors are operative for discharging the containers from the pockets through the outlet 5 and onto the conveyor F for transfer to the vacuum chamber. The drum, outside conveyors, feed fingers and ejectors are operated at proper time periods and in timed accord by mechanism which I will now proceed to describe.

A shaft 18, driven continuously in one direction by gearing 18ª from the shaft I, carries a crank arm 19 to which is pivotally coupled one end of a connecting rod 20, having a slotted opposite end 21 slidably and pivotally receiving a crank pin or stud 22 on a crank arm 23 keyed to the shaft 11, whereby driving motion is imparted to the drum 6 to rotate, on successive half-revolutions of the shaft 18, first in one direction and then in the opposite direction, through a 90° arc. At the end of each of these movements, through the angularity of motion of the rod 20, the motion of the arm 23 ceases, during which the pin or stud 22 is idle, the slotted end 21 of the rod 20 sliding in one direction or the other along said stud, dependent upon the direction of motion of the drum 6 and arm 23. During this idle period of the stud in the slot, whereby the mechanism is adjusted for the drum reversing action, a dwell in the motion of the drum occurs at the time its pockets register with the inlets 4—4ª and outlet 5, the interval of cessation of motion being just sufficient to permit of the feed and discharge of the containers. Also mounted on the shaft 18 is a cam 24 having a groove so formed as to present two active or working portions 25—26 and two inactive or dwell portions 25ª—26ª. A roller 27, mounted at one side of the base of a triangular rocker arm 28, is provided to travel in the cam groove for the purpose of alternately moving said rocker arm in opposite directions in the travel of the roller in the groove portions 25—26 and holding the rocker arm in its reverse positions in the travel of the roller in the groove portions 25ª—26ª. The rocker arm is pivotally mounted at its vertex upon the bottom head of the casing 1 and at the opposite side of its base is coupled by a connecting rod or link 29 to a longitudinally reciprocating actuating rod 30.

The rod 30 is periodically moved in opposite directions through the action of the cam for transmitting working motions to the fingers 15—15ª and ejectors 16—16ª. To this end, the ends of the rod 30 are coupled to levers 31 centrally fixed to pins 31 pivotally mounted on the casing 1, to which pins the fingers 15—15ª are fixed, the arrangement being such as to simultaneously swing the fingers in opposite directions. The rod is moved in one direction by the action of the cam groove portion 25 on the roller 27 so as to swing the finger 15 inwardly on its feed motion and at the same time swing the finger 15ª outwardly or retract it in order that it will lie out of the path of movement of a container to be fed up by the conveyor 14ª into alinement with the inlet 4ª. The fingers then remain in this position during the travel of roller 27 in the cam groove portion 25ª. When the roller 27 reaches the cam groove portion 26 this operation is reversed, the rod 30 being moved in the opposite direction so as to move the finger 15ª on its feed motion and retract the finger 15 so that the latter will lie out of the path of a container to be fed up by the conveyor 14 into alinement with the inlet 4. The fingers then remain in this position during the travel of the roller 27 in the cam groove portion 26ª. The levers 31 are also coupled by links or connecting rods 32 to the wrist pins of the lower arms of double crank like shifters 33—33ª, such arms being located beneath the lower head 3 of the casing 1. The center pins of these shifters are journaled in the head 3 and the upper arms of said shifters are disposed within the base of the casing 1 and provided with contact pins 34—34ª. These pins 34—34ª are adapted for engagement with crank arms 35—35ª fixed to the lower ends of the shafts or axes of the respective gear segments 17—17ª, which shafts or axes are journaled in the bottom head 8 of the drum 6, the said crank arms thus being arranged to lie, like the pins 34—34ª, between the heads 3 and 8 of the casing and drum. The shifter pins 34—34ª operate upon the arms 35—35ª at proper time periods, after said arms come in contact therewith, to shift the ejectors 16—16ᵃ on their outward container discharge motions. Contact pins 34'—34², fixed to the head 3, are provided for engagement with the arms 35—35ᵃ to shift the ejectors 16—16ᵃ in the reverse direction, whereby their retraction is effected. The working mechanism is completed through the provision of a segmental gear rack 36 fixed upon the bottom head 8 of the drum and meshing with a gear 37 mounted on a shaft 38 journaled in and extending downwardly through the head 3 of the casing 1 and carrying at its lower end a gear pinion 39 meshing with a mutilated gear 40 on the hub 16, whereby, as the drum is oscillated through the movements of its actuating mechanism, the conveyors 14—14ᵃ will be oscillated in unison therewith, but in the reverse direction to the drum.

The construction of the valve mechanism above-described applies particularly, as stated, to the injector valve E, and also applies generally to the construction of the ejector valve E', the latter differing from the former in certain particulars which I will now proceed to describe. Referring to Figures 4, 6 and 12, it will be seen that the ejector valve casing is provided with one inlet 4ᵇ and two outlets 5ᵃ—5ᵇ, the inlet 4ᵇ being disposed to face the vacuum chamber B and to receive containers from the conveyor G, while the outlets 5ᵃ—5ᵇ are disposed in the sides of the casing at right angles to the axial line of the opening 4ᵇ, the remaining side of the casing, i. e., that opposite the opening 4ᵇ and facing the final conveyor H, being closed. The pocket 10 of the drum of this ejector valve is movable between the inlet 4ᵃ and outlet 5ᵃ, while the pocket 10ᵃ of the drum is movable between the inlet 4ᵇ and the outlet 5ᵇ. Also in this construction the conveyor member 14 oscillates in the arc between the outlet 5ᵃ and the closed outer side of the valve casing for transferring the cans from said outlet 5ᵃ to the conveyor H, while the conveyor member 14ᵃ oscillates between the outlet 5ᵇ and the aforesaid closed side of the valve casing for transferring the containers from said outlet 5ᵇ to the conveyor H. Feed fingers 15'—15² are provided in this construction for respectively feeding the containers from the conveyor G through the inlet 4ᵇ and feeding the containers from the outside conveyor member 14 or 14ᵃ which is in final discharging position to the conveyor H. A mechanism differing from that of the injector valve is employed for operating these fingers and also operating the gear segments 17—17ᵃ in their direction of movement for shifting the ejectors 16—16ᵃ outwardly on their container expelling motions. This mechanism comprises a double cam 24ᵃ having a continuous groove provided with two working portions 41 and 42 and two idle portions 41ᵃ and 42ᵃ. A rocker arm 28ᵃ is provided with a roller 27ᵃ to travel in the cam groove, and to the roller carrying end of this rocker arm is fixed a crank arm 43 connected by a link 44 with a crank shaft 45 extending upwardly through a stuffing box 46 into an extension chamber 47 communicating with the passage between the vacuum chamber and inlet 4ᵇ, the finger 15' being fixed to the shaft 45 within said extension chamber and arranged for movement in said passage. By means of the mechanism described the actuation of the rocker arm 28ᵃ in one direction or the other will cause a rocking motion of the shaft 45, operating to move the finger 15' rearwardly out of line with the inlet 4ᵇ, so as to permit a container to be moved in advance thereof by the conveyor G, and then to swing the finger 15' forwardly to force the container through the inlet 4ᵇ and into the registering pocket 10ᵃ of the valve drum. To the rocker arm is also pivotally connected one end of a connecting rod 48, the opposite end of which is coupled by a crank pin 49 to a mutilated spur gear 50. This gear 50 meshes with a similar gear 51, with which in turn meshes an oscillating gear segment 52. The segment 52 is fixed upon a rock shaft 53 carrying the finger 15², whereby the latter is actuated. The finger 15² is adapted when retracted to move inwardly out of the way of the conveyor 14ᵃ, as said conveyor moves into discharge position, which is effected by the movement of the segment 52 in one direction, and said finger is adapted for outward movement under the reverse motion of the segment 52 to feed the container from the conveyor 14ᵃ onto the final conveyor H. The gear 50 is adapted to be moved through a prescribed arc in one direction, when the cam roller 27ᵃ travels in the arcuate cam portions 41 and 42, and to turn the gear 51 in the same direction and to the same degree, for the purpose of simultaneously shifting the fingers 15'—15² on their actuating motions, and then quickly retracting them through a reverse motion of their working connections, the fingers remaining in retracted position in the travel of the roller 27ᵃ in the cam groove portions 41ᵃ and 42ᵃ for a determined period during which the valve drum and outside conveyors 14—14ᵃ are being shifted on their working motions, the drum and outside conveyors remaining at rest during the actuation of the fingers through the lost motion connection between the connecting rod 20 and stud 22 previously described. To the gears 50 and 51 or their shafts are secured crank arms 53 and 54 which carry the pins 34—34ª adapted for engagement with the crank arms 35—35ª of the gear segments 17—17ª as previously described for shifting said gear segments in one direction, whereby the ejectors are projected, the stationary pins 34'—34² being employed in this construction and as previously described for shifting the gear segments 17—17ª in the reverse direction, whereby the ejectors 16—16ª are retracted. With the exceptions above noted, the construction and mode of operation of the ejector valve is the same as that described with respect to the injector valve.

In the operation of the machine, the containers, previously filled by an accepted type of filling machine, are transferred by the conveyor D to the clincher A, driven by gearing A' from the shaft J, by which the container tops or lids are loosely applied to the containers. The containers, one by one, as they pass from the clincher, are alternately received by the outside conveyors 14—14ª and conducted to the inlets 4—4ª of the injector valve, into the pockets 10 and 10ª of which the containers are forced by the fingers 15—15ª. It will be understood from the foregoing description that when the conveyor 14 is in position for the delivery of a container into the pocket 10, the conveyor 14ª will be in position to receive a container from the clincher and the pocket 10ª will be in position for the discharge of a container previously entered thereinto onto the conveyor F, whereby it is introduced in the vacuumizing chamber B. With the parts in the above-described positions, the ejector 16 will be retracted and the ejector 16ª projected by their operating segments and the drum will be held stationary by reason of the fact that at this stage stud 22 will be traveling in the slot 21 at the completion of one operating motion of said connecting rod 20. At this time the rack 36 will be out of mesh with the gear 37, so that the conveyors 14—14ª remain in a stationary condition. When the finger actuating mechanism is operated to move the finger 15 inwardly on its feed motion and to retract finger 15ª, the pin 34 is set to be engaged by the crank arm on the segment 17ª by the movement of said segment into engagement therewith on the rotation of the drum, so that in the motion of the finger actuating rod 30 the pin will engage said crank arm and swing the segment 17ª to shift the ejector 16ª on its ejecting motion. When, on the next subsequent half revolution of the drum, whereby the filled pocket 10 is moved to register with the outlet 5 and the empty pocket 10ª moved to register with the inlet 4ª, at which time the conveyor 14ª moves into registry with the inlet 4ª and the conveyor 14 moves into alinement with the clincher A, the crank arm of the segment 17ª comes into contact with the pin 34², whereby it is moved in the reverse direction to that previously described and the ejector 16ª retracted. From this explanation, the operation of the gear segments 17—17ª by the use of the pins provided for shifting them will be readily understood. It will also be seen from the foregoing that on each complete oscillation of the injector valve two containers will be taken up by the valve and introduced through the medium of the same into the vacuumizing chamber.

The containers entering the vacuumizing chamber are fed by the conveyor F to the double seamer, the containers being vacuumized in the chamber prior to the action of the double seaming device, whereby the lids of the containers are applied and hermetically sealed. The containers delivered by the seamer pass onto the belt G and are conveyed thereby to the inlet of the injector valve into which they are introduced by the action of the finger 15'. On alternate reverse movements of the injector valve drum the pockets 10 and 10ª are presented at the inlet 4ᵇ to receive containers, which are delivered through the mechanism described through the outlets 5ª and 5ᵇ to the conveyors 14 and 14ª which alternately move into receiving and discharging position, the containers being by the action of these conveyors and the finger 15² transferred to the final conveyor H which carries the vacuumized and sealed containers to a desired destination point.

In the operation of the machine, as above described, it will be understood that the foregoing motions of all the parts are properly timed and co-ordinated, the discharge capacity of the ejector valve being equal to the feed capacity of the injector valve and all other parts working accordingly. By means of these valves, which are especially designed to prevent leakage of air at their points of communication with the vacuumizing chamber, such chamber will at all times be securely sealed against the ingress of air through the valves, so that a high degree of vacuum may be maintained. The organization of the machine as a whole, and the improved structural features characterized by my invention, enables an organized structure to be provided which embodies a comparatively small number of working parts operating with considerable speed, so that a very large number of containers may be acted upon within a given working period. By employing an oscillating motion of the valves instead of a continuous rotating motion in a single direction, a substantial advantage is gained in that the oscillating speed may be slow at the start of each working motion, gradually increasing to the mid point and gradually slowing to the end of the working motion, allowing an easy action to be obtained so that enameled or fancy labeled containers may be handled without liability of injury to their surfaces.

It is to be understood that in the appended claims the words "feed valve," wherever broadly used, are to be construed as covering a valve of the structural and functional qualifications defined, irrespective of its particular purpose, whether for transferring containers to the vacuumizing chamber or discharging the containers therefrom. It is also to be understood that, except when claimed in combination with elements of a vacuumizing machine or the like, the valve is not intended to be restricted in use thereto, as it may be employed as an injector or ejector in connection with steam pressure cookers generally where the use of such a valve is desirable or required.

Having thus fully described my invention, I claim:

1. A feed valve comprising a casing having openings therein at different points, and a drum in said casing oscillatable on an arc of 90° between said openings for transferring a container from one to the other.

2. A feed valve comprising a casing having a discharge opening and a plurality of inlet openings, an oscillatory drum within the casing having pockets movable on reverse movements of the drum between an inlet opening and the discharge opening, means for periodically oscillating the drum, means for introducing containers through the inlet openings into the pockets as the latter register therewith, and means for discharging the containers from each pocket upon its registry with the discharge opening.

3. A feed valve comprising a casing having a discharge opening and inlet openings, arranged at an angle of 90° to the discharge opening, an oscillatory drum in the casing having pockets arranged at an angle of 90° to each other and oscillatable to move the pockets alternately into and out of registry with the discharge opening and the respective inlet openings, means for feeding containers through the inlet openings into the pockets, and means for discharging the containers from the pockets through the discharge opening.

4. A feed valve comprising a casing having a discharge opening and a plurality of inlet openings, an oscillatory drum arranged in said casing and provided with pockets movable through the oscillations thereof between said openings, means for periodically oscillating the drum, oscillatable conveyors movable into and out of registry with certain openings, feeders for introducing containers through certain of said openings into the drum pockets registering therewith, and means for discharging the container from each drum pocket on its registry with the discharge opening.

5. A feed valve comprising a casing having at least three openings arranged therein at an angle of 90° to each other, an oscillatory drum disposed in said casing and provided with pockets arranged at an angle of 90° to each other, said drum being oscillatable to alternately shift the pockets between two of said openings and the remaining opening, and means for feeding the containers into the pockets through at least one of said openings and discharging the containers from the pockets through at least one of said openings.

6. A feed valve comprising a casing having openings arranged in three of its sides, the fourth side being closed, an oscillatory drum in said casing having a pair of pockets each alternately movable between one of the openings and another opening, means for periodically oscillating the drum, oscillating conveyors movable between the closed side of the drum and certain of said openings, and means for oscillating said conveyors in a direction reverse to the direction of oscillation of the drum and between periods of motion of the drum.

7. A feed valve comprising a casing having a plurality of openings arranged at 90° intervals, an oscillatory drum therein having pockets arranged at an angle of 90° to each other, said drum being movable to alternately connect the pockets with certain openings, an outside oscillatable conveyor movable between certain of said openings and a mid position between said openings, and means for oscillating the drum and outside conveyor alternately and in opposite directions to each other.

8. A feed valve comprising a casing having inlet and discharge openings, an oscillatable drum therein provided with pockets and alternately movable to bring the pockets into registry with a certain opening and other openings, means for oscillating the drum with an interval of dwell between periods of operation, container feeding and discharging means associated with the casing opening and drum pockets, an oscillatable outside feeder comprising members movable between the feed point and certain of said pockets, and means for oscillating the outside feeder between periods of oscillation of the drum.

9. A feed valve comprising a casing having openings therein, an oscillatory drum within the casing having pockets for cooperation with the openings, container feeding and discharging means associated with the openings and pockets, and an oscillatory outside conveyor arranged for cooperation with certain pockets.

10. A feed valve comprising a casing having openings therein, an oscillatory drum within the casing provided with pockets for cooperation with said openings, an externally arranged oscillatory feeder, and means for alternately operating said drum and externally arranged feeder.

11. A feed valve comprising a casing having openings therein, an oscillatory drum arranged within the casing and having pockets for cooperation with said openings, an externally arranged oscillating feeder for cooperation with the openings, and means for oscillating the drum and external feeder in alternation and in opposite directions.

12. A feed valve comprising a casing having openings therein, an oscillatory drum arranged within the casing and having pockets for cooperation with said openings, an externally arranged feeder for bringing containers into registry with certain of said openings, means for shifting said containers from said feeder into said openings, means for discharging the containers from the pockets through an opening, and means for operating the aforesaid parts in timed accord.

13. A feed valve comprising a casing having openings therein, an oscillating drum within the casing provided with pockets for cooperation with said openings, an oscillatory outside conveyor movable alternately into register with certain openings, means cooperating therewith for displacing containers held thereby therefrom, means for ejecting containers from the pockets through one of the openings, and means for operating the aforesaid parts in timed accord.

14. A feed valve comprising a casing having one or more inlet openings and one or more discharge openings, an oscillatory drum within the casing having pockets for cooperation with said openings, means for introducing containers through the inlet opening or openings into the pockets of the drum, a discharge device associated with each pocket for discharging a container therefrom through a discharge opening, and means for projecting and retracting each discharge device on reverse oscillations of the drum.

15. A feed valve comprising a casing having one or more inlet openings and one or more discharge openings, an oscillatory drum within the casing having pockets for cooperation with said openings, means for introducing containers through the inlet opening or openings into the pockets of the drum, a discharge device associated with each pocket for discharging a container therefrom through a discharge opening, means movable in one direction of movement of the drum for projecting each discharge device, and means movable in the opposite direction of movement of the drum for retracting the discharge device.

16. A feed valve comprising a casing having openings for inlet and exhaust of containers, a cooperating pocketed oscillatory drum arranged within said casing, a cooperating oscillatory outside conveyor, automatically operable container ejectors associated with the drum pockets, means for projecting and retracting the same, means for oscillating the drum, and means for oscillating the outside conveyor.

17. A feed valve comprising a casing having container inlet and exhaust openings, an oscillatory pocketed drum arranged therein, an outside oscillatory conveyor movable from a point about the drum alternately into registry with certain openings, feeders for displacing containers from the outside conveyor, ejectors for discharging containers from the pockets, means for oscillating the drum and holding the same idle between periods of operation, and means for oscillating the outside conveyor between periods of oscillation of the drum and holding the same idle during the oscillations of the drum.

18. A feed valve comprising a casing having openings arranged in three of its sides and having its fourth side closed, an oscillatory drum within the casing provided with pockets each movable between a particular opening and another opening with which both pockets are adapted to alternately register, an outside oscillatory conveyor comprising members movable between the closed side of the drum and openings at opposed sides of the casing, feeders for displacing containers from the outside conveyor members, ejectors for displacing containers from the pockets when they register with their common registration opening, and means for operating the aforesaid parts.

19. A feed valve comprising a casing having openings arranged in three sides thereof at right angles to each other, the fourth side of the casing being closed, a rotary drum in the casing provided with a pair of pockets at an angle of 90° to each other, one of said pockets being movable between the central opening and one of the terminal openings of the series and the other pocket between the central opening and the other terminal opening of the series, an oscillatory outside conveyor comprising members movable through reverse motions of said conveyor between the closed side of the drum and the aforesaid terminal openings of the series, feeders for displacing containers from the outside conveyor members in certain positions of the latter, ejectors for discharging containers from the pockets in certain positions of the latter, and means for operating the aforesaid parts.

20. A feed valve comprising a casing having openings arranged in a series in three of its sides and having its fourth side closed, an oscillatory drum within the casing having a pair of pockets arranged at an angle of 90° for cooperation with said openings, an outside conveyor comprising a pair of simultaneously movable members arranged at an angle of 90° from each other and shiftable between the closed side of the casing and certain of said openings, pivotally mounted feeders for displacing containers from the outside conveyor members when the latter are disposed in determined positions, ejectors for ejecting containers from the pockets, cam mechanism for actuating the feeders, means for projecting and retracting the ejectors, and means for oscillating the drum and outside conveyor.

21. A feed valve comprising a casing having openings, one of which is to be sealed, a container feed drum in said casing, adjustable bearings for the drum, wear surfaces on the casing adapted to be engaged by the surfaces of the drum adjacent said opening to be sealed under pressure in one direction on the drum, and means for adjusting the drum to regulate its pressure against said wear surfaces.

In testimony whereof I affix my signature.

ALEXANDER K. RARIG.